(12) United States Patent
Torrelli

(10) Patent No.: US 6,607,431 B2
(45) Date of Patent: Aug. 19, 2003

(54) CUTTING UP INSTALLATION HAVING A MOVING STATION

(75) Inventor: Didier Torrelli, Guilherand Granges (FR)

(73) Assignee: Durand International, Chomurac (FR)

( * ) Notice: Subject to any disclaimer, the term of this patent is extended or adjusted under 35 U.S.C. 154(b) by 0 days.

(21) Appl. No.: 09/784,079

(22) Filed: Feb. 16, 2001

(65) Prior Publication Data

US 2001/0016471 A1 Aug. 23, 2001

(30) Foreign Application Priority Data

Feb. 18, 2000 (FR) .............................................. 00 02041

(51) Int. Cl.$^7$ ................................................ A22C 18/00
(52) U.S. Cl. ........................................ 452/149; 452/160
(58) Field of Search ................................. 452/149, 160

(56) References Cited

U.S. PATENT DOCUMENTS

| 4,507,822 A | * | 4/1985 | Herubel | ...................... 452/160 |
| 4,653,150 A | | 3/1987 | Leining | |
| 4,667,371 A | * | 5/1987 | Vogt | ............................ 452/160 |
| 5,421,772 A | * | 6/1995 | Durand | ...................... 452/160 |
| 5,626,515 A | * | 5/1997 | Krogh | ......................... 452/160 |
| 5,655,960 A | | 8/1997 | Van Horeebeck | |
| 6,126,536 A | * | 10/2000 | Kielwasser | ................. 452/160 |

FOREIGN PATENT DOCUMENTS

| DE | 3023742 A1 | 1/1982 |
| DE | 197 46 456 A1 | 4/1999 |
| FR | 725242 | 5/1932 |

* cited by examiner

Primary Examiner—Peter M Poon
Assistant Examiner—Joan M. Olszewski
(74) Attorney, Agent, or Firm—Blank Rome, LLP

(57) ABSTRACT

An installation (1) having a moving station for cutting up carcasses (2) of meat animals, the installation comprising two columns (14, 15) mounted to move over a certain stroke in the direction in which the carcasses move and in the opposite direction. One of the columns (15) carrying an abutment device (43) for coming into abutment against the outside dorsal face of the carcass along the backbone. The other column (14) carrying a cutting-up device (17) inserted via the ventral face under the tail and mounted to move vertically, and an internal guide device (31) situated under the cutting-up device (17) inserted via the ventral side of the carcass. The installation being characterized in that it includes a control and servo-control device for controlling the movement of the internal guide device (31), the abutment device (43), and the cutting-up device (17).

27 Claims, 11 Drawing Sheets

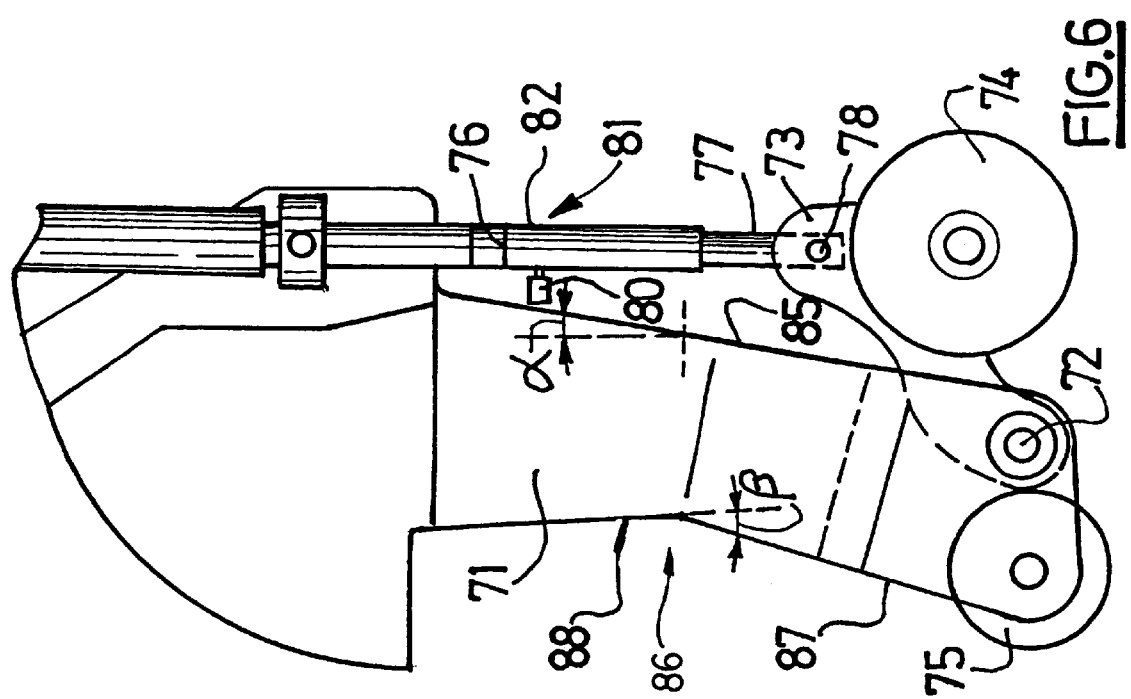

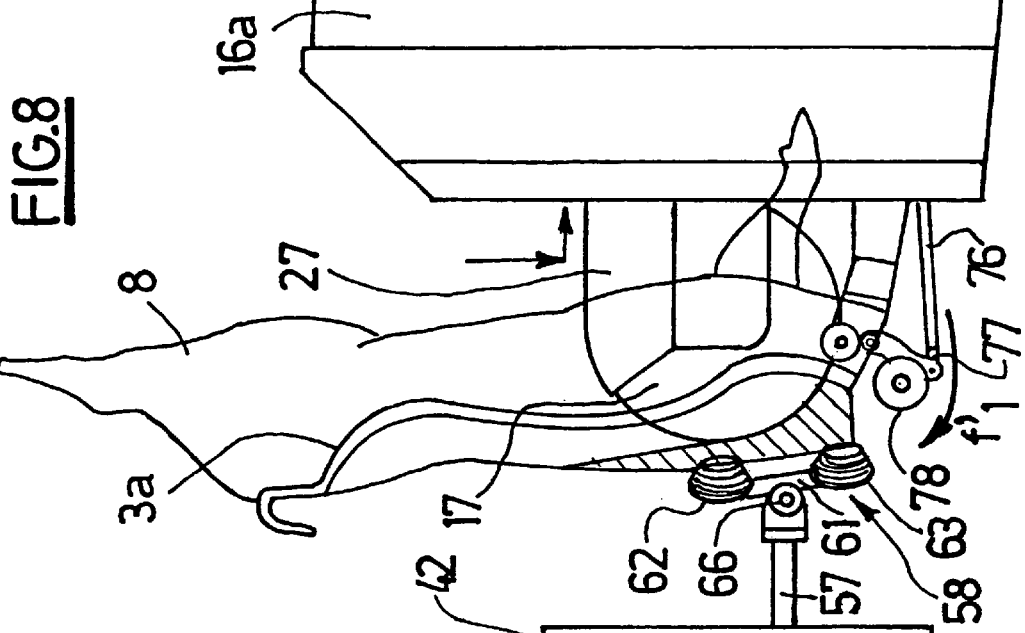
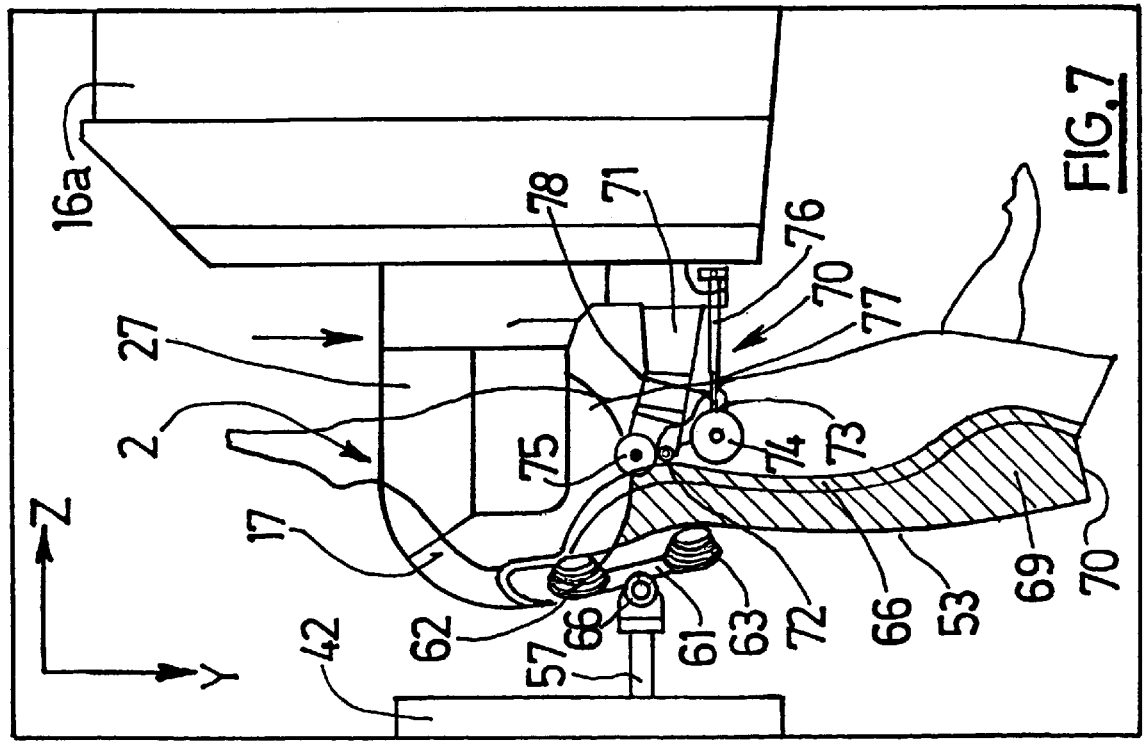

CUTTING UP INSTALLATION HAVING A MOVING STATION

BACKGROUND OF THE INVENTION

The present invention relates to the general field of slaughtering meat animals, and it relates more particularly to the operation of cutting up a carcass after it has been eviscerated.

More specifically, the invention relates to cutting up carcasses of animals such as swine, ovines, or bovines.

The operation of cutting up an animal carcass typically takes place by suspending the carcass vertically by its hind legs, and by performing the cutting up operation along the backbone by means of a cutting tool such as knives or a circular saw, using an automatic cutting-up method making it possible to achieve working throughputs compatible with the requirements of industrial slaughterhouses.

Such a method consists in causing the carcasses to advance as suspended from a transporter or conveyor past a station comprising an automatic machine including a cutting tool that can be inserted between the hind legs of the suspended carcass so as to act on a vertical cutting plane by cutting up the carcass into two half-carcasses.

Cutting-up installations are already known in which the cutting-up operation can take place on a fixed processing station, or "on the fly", i.e. by combining the vertical movement of the cutting member with the lateral displacement of the carcass when the transporter or conveyor advances continuously. This operation makes it possible to cut up the carcass of a meat animal into two half-carcasses that are separated so as to be directed subsequently to other processing stations.

Depending on the needs arising from the carcass processing subsequent to cutting-up, or depending on the means implemented to suspend the carcass on the transporter, it may be desirable to cut up the carcass while allowing a link to remain between the two half-carcasses. The cutting-up is then intentionally limited to most of the carcass, without however being performed over the entire carcass, so as to avoid obtaining two half-carcasses that are fully separated. Such cutting-up may be referred to as "American cut".

Such is the case, for example, when the carcass is suspended from the transporter by means of a support of the hanger or gambrel type that has a single hinge only for a single suspension yoke to the ends of whose arms the hind legs of the carcass are fixed. If the cutting-up is performed fully, it produces two half-carcasses which then move with an uncontrolled swinging motion that adversely affects their stability and their subsequent removal. It is thus desirable to cut up the carcass only over most of it, while leaving a remaining link, typically facing the bottom end in the vicinity of the head, or as from the middle of the back with a zone of dorsal rind that is not cut through. The bottom end is typically the end portion of the rachis if the head has been removed. In any event, the cutting-up must make it possible to cut through all of the bones in the backbone, the two half-carcasses being connected together after cutting-up via a non-bony zone: the desired link is to be obtained without any bones and at the rachis.

Industrial slaughterhouses thus need means for performing such limited automatic cutting-up, with a high working throughput, and regardless of the lengths of the carcasses arriving at the processing station.

In the prior art, the machine described in Document FR-2 535 944 is known, for example. That machine comprises two fixed assemblies, which does not make it possible to obtain a desired very high throughput of about 500 animals per hour to 600 animals per hour, such a throughput being obtained by the present invention.

That machine describes a first column including the cutting member, and, facing it, a second column including an external dorsal guide member for guiding the outside dorsal face of the carcass while it is being cut up. A mechanical link is formed between the cutting member and the external guide member during cutting-up. The vertical guide carriage is constrained to move with the dorsal guide carriage. It is not therefore possible to control those two members independently.

A dynamic machine is also known from Document U.S. Pat. No. 5,655,960, making it possible to achieve high throughputs. Unfortunately, when it reaches the bottom end portion of the carcass, the support arm for supporting the cutting member can come into abutment and damage said bottom end portion. In addition, at the end of cutting-up, the external guide wheels do not follow the outside dorsal face of the animal, and thus they no longer guide it from then until the end of cutting-up.

SUMMARY OF THE INVENTION

An object of the installation of the invention is to enable the external guide member, the cutting member, and the internal guide member to be controlled independently. In addition, an object of the installation is to guarantee that the external guide member is positioned strictly face-to-face with the cutting blade and with the internal guide member. An object of the invention is thus to achieve accurate control over both the horizontal positioning and the vertical positioning between the cutting member and the external guide member, and to do so for high throughputs of up to in the range 500 animals per hour to 600 animals per hour.

In addition, an object of the invention is to provide optimum external guiding during cutting-up, the external guide member being suitable for matching the shape of the outside face until the end of cutting-up.

In a first aspect, the invention provides an installation having a moving station for cutting up carcasses of meat animals, in particular pigs, suspended from a transporter by their hind legs, said installation comprising two columns facing each other and defining between them a space through which the animals to be cut up advance continuously, said two columns being mounted to move over a certain stroke in the direction in which the carcasses move, and in the opposite direction, an "abutment" one of the columns carrying an abutment device including means for coming into abutment against the outside dorsal face of the carcass along the backbone, following the cutting-up, the "cutting-up" other column carrying a cutting-up device comprising firstly cutting-up means inserted via the ventral face under the tail, and mounted to move vertically, and secondly an internal guide device comprising guide means situated under the cutting-up means inserted via the ventral side of the carcass and acting against the abutment means, said installation further comprising a control and servo-control device for controlling and servo-controlling the movement of the internal guide device, of the abutment device, and of the cutting-up device, the control and servo-control device being suitable for enabling the abutment means to be moved independently from the cutting-up means.

In a preferred embodiment of the invention, the installation further comprises uniting means for uniting the cutting-up column and the abutment column, the cutting-up column and the abutment column forming a single unit so as to guarantee the desired face-to-face position of the external abutment means, of the cutting-up means, and the internal guide means during cutting-up.

The cutting-up column comprises a lift column mounted to be moved in translation parallel to the horizontal direction of advance of the carcasses by first drive means of the motor type, a lift carriage mounted to be moved in translation vertically relative to the moving column by means of second drive means of the motor type, and a carrier beam for carrying the cutting-up device, which beam is mounted to be moved relative to the lift carriage and to be brought from a retracted position to a cutting-up position by third drive means of the hydraulic actuator type, the first drive means, the second drive means and the third drive means being distinct and connected to a programmable logic controller of the control and servo-control device which also controls actuating of the cutting-up means.

The abutment column comprises a moving lift frame that is mounted to be moved parallel to the horizontal direction of advance by fourth drive means, a support frame for supporting the abutment device, which frame is mounted to be moved vertically relative to the lift frame by fifth drive means, the uniting means interconnecting the moving column and the lift frame via their tops or via their bottoms, the fourth and fifth drive means being distinct and connected to the programmable logic controller constituting the distributor of the control and servo-control device which also controls the actuating of the cutting member.

In another embodiment, the cutting-up column comprises a first lift frame mounted to move in vertical translation relative to a fixed structure, supporting a cutting-up frame that is mounted to move in horizontal translation relative to the first lift frame parallel to the direction of advance of the carcasses, the cutting-up frame supporting the carrier beam for carrying the cutting member, which beam is itself mounted to move transversely to the direction of advance of the carcasses. The abutment column comprises a second lift frame that is mounted to move in vertical translation, and that supports the external abutment frame mounted to move in horizontal translation relative to the second lift frame, the abutment frame supporting the guide member which is mounted to move transversely to the direction of advance of the carcasses. The uniting means for assembling the single unit formed by the cutting-up column and by the abutment column may move in a groove situated in the floor.

In an embodiment, the third drive means comprise an in/out actuator making it possible for the internal guide means to be moved relative to the cutting-up means.

The internal guide device comprises two top guide wheels and two bottom guide wheels mounted on the same support arm, and the abutment device comprises an external abutment yoke that can be retracted from a position in which it is spaced apart from the dorsal face of the carcass to a position in which it abuts against said dorsal face, the yoke carrying two top abutment wheels and two bottom abutment wheels, the abutment wheels being antagonistic to the guide wheels.

The control device includes monitoring means for monitoring the position of the cutting-up means and of the abutment means, and is suitable for controlling the drive means on the basis of speed profiles and/or position profiles that are predetermined or that are calculated for each carcass.

In an embodiment, the monitoring means comprise a detection device for detecting the bottom end portion of the carcass, the response to such detection being to cause the cutting-up means to be retracted.

In a variant embodiment, the detection device comprises an emitter element for emitting a light beam, which element is carried by an arm fixed to the carrier beam, and a receiver element fixed to the bottom portion of the support frame for supporting the internal guide member, so that the carcass to be cut up intercepts the light beam until the desired cutting-up position is reached.

In another variant embodiment, the detection device comprises two bottom wheels mounted on detection means actuated by an actuator rod, the detection means being moved to a threshold position causing the cutting-up means to be retracted.

In another variant, the detection means are constituted by a yoke carrying the top guide wheels and the bottom guide wheels, the axis of rotation of the bottom wheels and the axis of rotation of the top wheels of the guide means being movable relative to the axis of rotation of the cutting-up member.

In another variant, the detection means are constituted by a lever carrying the bottom guide wheels, the axis of rotation of the top wheels being fixed relative to the axis of the rotation of the cutting member, while the axis of rotation of the bottom wheels is movable relative to the axis of rotation of the cutting member.

In an embodiment, the axes of rotation of the wheels of the external abutment yoke are substantially parallel to the dorsal face of the carcass during cutting-up.

In another embodiment, during cutting-up, the axis of rotation of each of the wheels of the external abutment yoke points towards the dorsal face of the carcass at an angle of in the vicinity of 30° thereto, the wheels being frustoconical, making it possible to re-center the flesh and the apophyses before the saw blade passes.

Typically, the cutting member comprises a rotary saw of diameter in the range 300 mm to 600 mm and that can be used in particular for sows and calves, or else it comprises cleaving knives.

In an embodiment, the installation further comprises a protection device for protecting the hams of the carcass, which device includes retractable protection means carried by the lift column and fixed relative to the carcass, which means serve by tilting or moving in some other manner above the hams to co-operate with at least one receiving zone of the abutment column that is fixed relative to the carcass, so as to hold the hams apart while avoiding any unwanted contact between them and the carrier beam.

In a second aspect, the invention provides a method of implementing an installation as claimed, said method comprising the following steps:

measuring the carcass, the body of the animal being whole, with or without the head, and not slit on the backbone side, and detecting the start of cutting up;

actuating the control and servo-control device;

causing the cutting-up column and the abutment column to move accordingly so as to move the cutting-up device and the abutment device in all three dimensions, the abutment means being applied against the outside dorsal face of the animal, and the cutting-up member performing the cutting-up, the carcass being moved simultaneously with the cutting-up;

detecting the end-of-cutting position;

stopping the cutting-up, removing the cut-up carcass, and returning the cutting member and the abutment member to their initial position for the following carcass.

In an implementation, the end-of-cutting detection is performed as a function of whether the internal guide device is bearing against the end portion of the carcass.

In an implementation, the cutting-up device and the external guide device are moved relative to each other along a substantially vertical axis and in a direction therealong such that the external guide means perform external guiding until the end of cutting-up.

BRIEF DESCRIPTION OF THE DRAWINGS

Other objects and advantages of the invention appear from the following description given with reference to the accompanying drawings in which:

FIG. 5 shows an enlargement of an intermediate cutting position in the embodiment of FIG. 2;

FIG. 6 shows an enlargement of the detection device for detecting the end of cutting in the embodiment shown in FIGS. 4a to 4e;

FIGS. 7 and 8 are enlargements of FIGS. 4c and 4f;

DETAILED DESCRIPTION OF THE DRAWINGS

Figure 1:
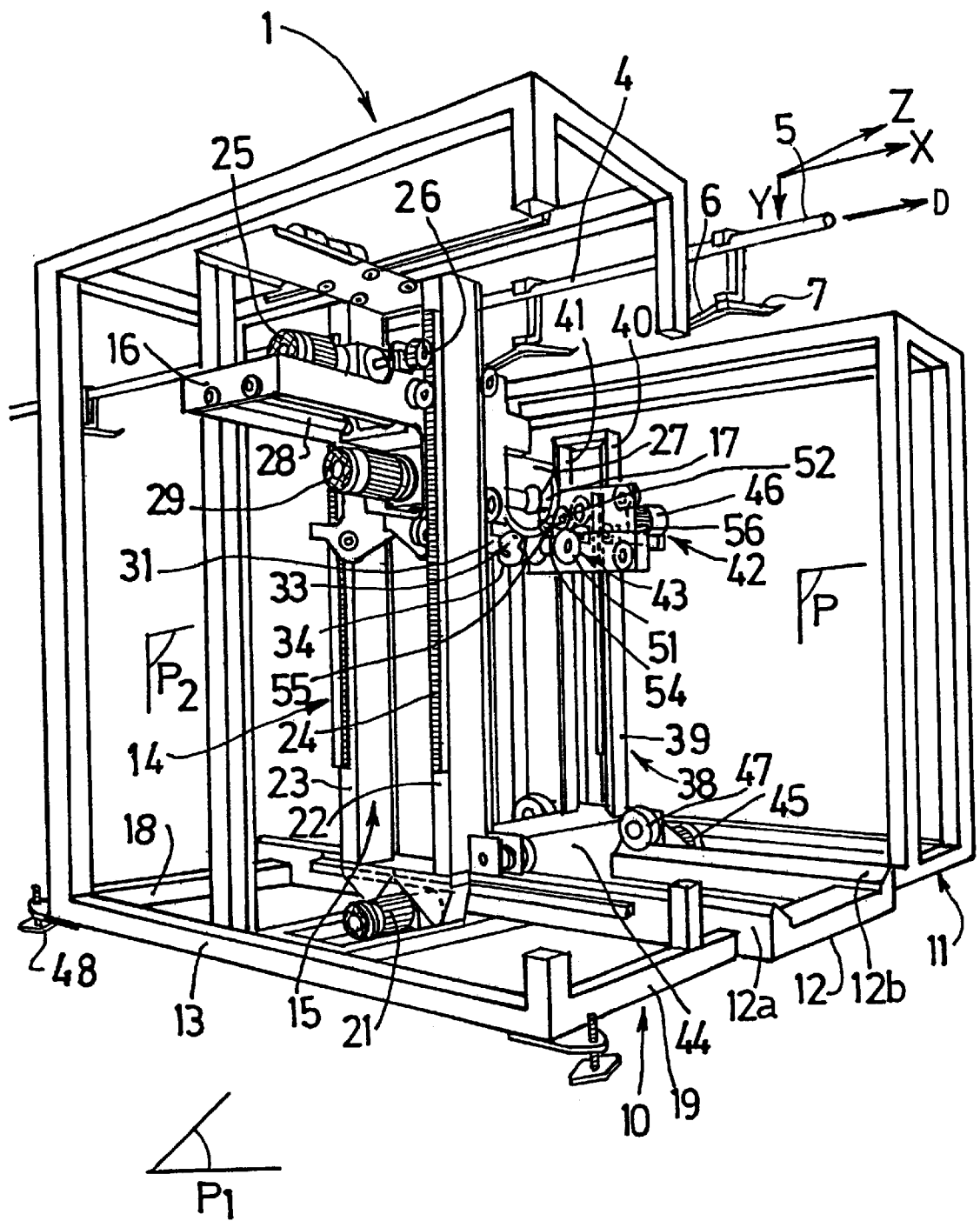
FIG. 1 is an overall perspective view of a first embodiment of an installation of the invention.
Figure 2:
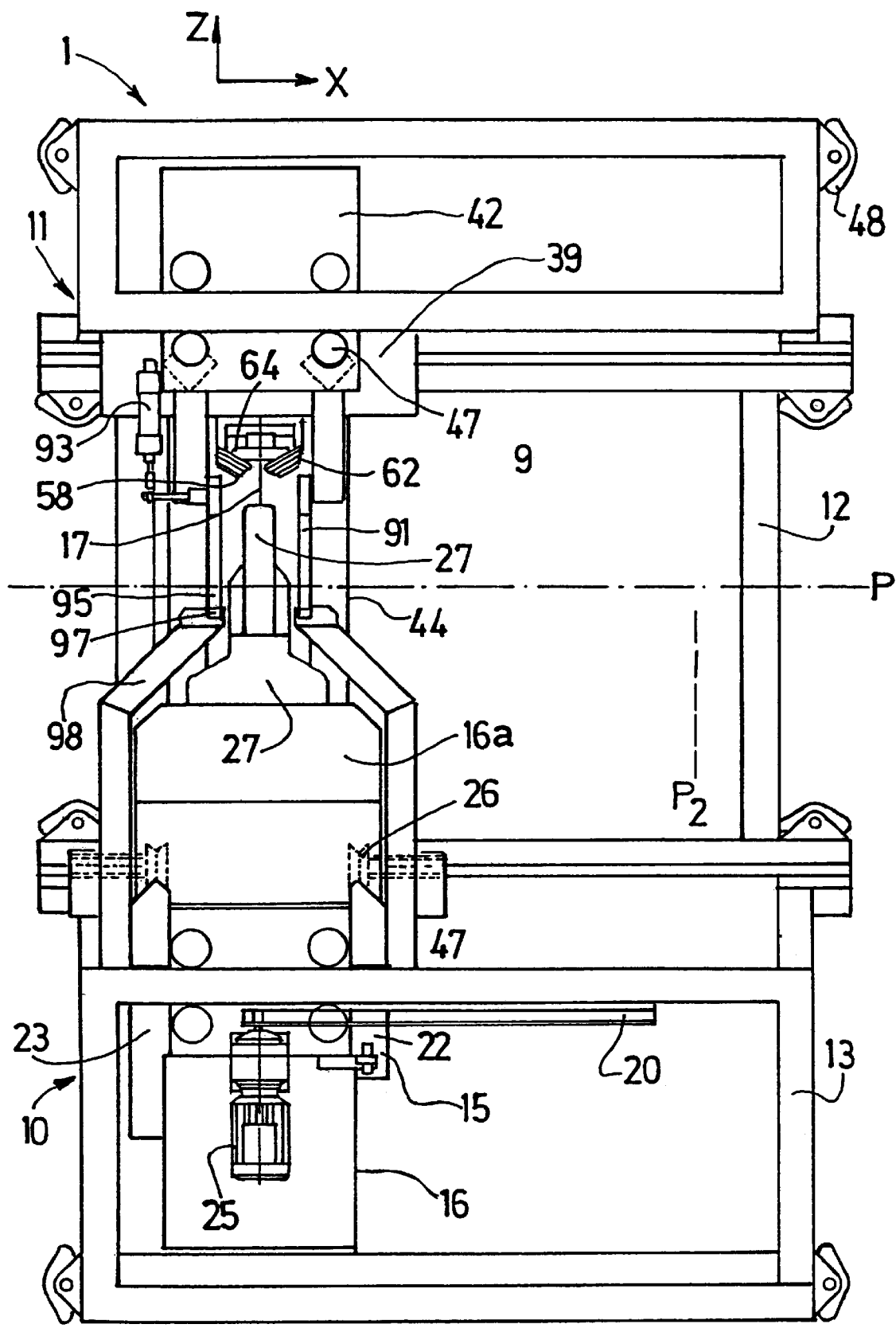
FIG. 2 is a plan view of the installation of FIG. 1.

FIG. 1 shows a sawing installation for cutting up the carcass 2 of a meat animal as suspended by its hind legs 3 from a transporter 4 that advances continuously or discontinuously.

The transporter 4 may be constituted by a conveyor of appropriate form and construction, making it possible to suspend the carcass 2 and to move it in a direction D by means of suspension means 5 such as a gambrel having two branches 6, 7, onto the ends of which the hind legs 3 are hooked. The direction D lies in a vertical advance plane P in which the carcasses 2 advance.

The carcass 2 is suspended such that it has its ventral face 8 facing the processing stations along the slaughtering line, one of which stations is a moving cutting-up station 9.

The installation 1 comprises a first assembly 10 referred to as a "cutting-up assembly", and, facing it, a second assembly 11 referred to as an "external guide assembly" or as an "external abutment assembly". As they advance, the carcasses have their outside dorsal faces 53 facing the second assembly 11, and their ventral faces 8 facing the first assembly 10. The carcasses 2 arrive in the eviscerated state via the transporter 4.

The carcass is cut up either with a link being left after cutting-up between the two half-carcasses via a bone-free non-cut-up portion of the animal, or else with the carcass being cut through completely over its entire length.

The cutting-up assembly 10 firstly comprises a moving cutting-up frame or column 14 that is mounted to move in translation parallel to the direction of advance of the carcasses.

The cutting-up assembly 10 secondly comprises a fixed structure or gantry 13. The cutting-up column 14 is mounted to move relative to the gantry 13. In the embodiment shown, the gantry comprises four vertical bars, four bottom horizontal bars and four top horizontal bars so as to form a cage. Other embodiments of this structure are possible, the object being to have a cutting-up column that is mounted to move in translation relative to a fixed structure.

The cutting-up column 14 itself comprises a moving raising and lowering lift column 15 and a lift carriage 16 that supports a carrier beam 27 for carrying the cutting-up member 17 such as a saw.

The gantry 13 is suitable for guiding the moving column 15 of the cutting-up frame 14, which column can be moved on a horizontal plane P1 between a first end position in the vicinity of a bar 18, and a second end position in the vicinity of a bar 19 via guide means 20 such as slideways or runners and by first drive means 21, such as a motor, for delivering horizontal drive.

The three directions in three-dimensional space are referred to as X, Y, and Z. The direction X is the horizontal direction along which the carcasses advance, and it lies in the plane P. Y is the vertical direction in a plane P2 transverse to the plane P.

The moving lift column 15 comprises two carrier uprights 22 and 23. The uprights 22 and 23 support the lift carriage 16 via guide means 24 such as V-shaped section members, the lift carriage being mounted to move relative to the column 15 in the vertical direction Y between a high first end position at the start of cutting-up and a low second end position at the end of cutting-up.

This vertical movement is achieved by second drive means such as a motor 25 placed on the lift carriage 16 which also supports pinions 26 that mesh with racks 24. It is also possible to use a cables/belts system.

The carrier beam 27 is mounted to be moved transversely relative to the direction of advance of the carcasses D via guide means such as shafts or ball bushings 28 and by third drive means such as an in/out actuator installed in the lift carriage 16 above the shafts 28 and not shown in FIG. 1, on the cutting-up plane P2, the plane P2 moving with the carcass during cutting-up.

The carrier beam 27 carries the cutting member 17 constituted, for example, by a circular saw 30 suitable for being rotated in the plane P2 by a motor member 29 carried by the carrier beam 27.

The cutting member 17 may also comprise knives moved in reciprocating oscillation in the plane P2 as described in available documents of the prior art.

The cutting-up assembly 10 further comprises an internal guide device 31 supported by the carrier beam 27.

The internal guide device 31 is carried below and slightly set back from the cutting member 17.

The guide device 31 comprises an arm 32 carrying an internal yoke 34 via a horizontal pivot pin 33, said yoke supporting superposed wheels, namely a pair of top wheels 35 and a pair of bottom wheels 36. The operation of the wheels is described below.

In addition, the abutment assembly 11 firstly comprises an abutment frame or column 38 which itself comprises a lift frame 39 having two uprights 40 and 41, and a support frame 42 for supporting the external guide or abutment device 43 which is described below. The abutment column 38 is mounted to move in translation parallel to the direction of advance of the carcasses.

The external abutment assembly 11 secondly comprises a fixed structure which is a gantry 37 in this example and which may be analogous to or different from the gantry 13. The abutment column 38 is mounted to move relative to the structure 37.

The cutting-up frame or column 14 of the cutting-up assembly, and the guide frame or column 38 of the guide assembly 11 are connected together via a link frame such as a base 44 so as to form a single unit. The cutting-up column 14 and the external abutment column 38 thus do not form two independent moving frames, but rather they form a single moving frame mounted to move relative to the fixed structures 13, 37.

The link base 44 between the two columns 14, 38 is mounted to be moved in the direction D relative to the structures 13 and 37 via guide means such as guide feedthroughs 12a, 12b in a stand 12 and via wheels 47, said guide means being part of respective ones of the assemblies 11, 13. This embodiment is an advantageous embodiment of the invention: with such a base 44, the cutting member 17 and the external abutment member 43 are guaranteed to be relatively positioned so that they are strictly facing each other, and the resulting geometry is also guaranteed.

It is thus possible to provide a cutting-up installation whose dorsal external guide member and whose cutting blade and internal guide member assembly are totally distinct, the frame or column 14 that supports the cutting member 17 moving independently from the abutment column or frame 38 that supports the external guide member, in the absence of any uniting means such as the base 44. However, it is then possible for difficulties to be encountered related to the servo-controlling of the two columns, and in particular to the operation of the three-dimensional synchronization means that are necessary to enable the two separate columns to be moved. In addition, in particular when the installation is used at high cutting-up frequencies, problems can arise: differential wear between the columns, defective operation, strength, and emergency stop in particular. Furthermore, the assembling, adjusting, and repairing that are necessary when malfunctions occur can constitute lengthy operations.

Returning to the embodiment shown in FIG. 1, the lift frame 39 and thus the guide frame 38 are mounted to move in horizontal translation by being moved in direction X by the drive means 21 for driving the moving column 15 connected via the base 44 to the lift frame 39 and/or by fourth drive means 45 such as a motor distinct from the motor 21.

Fifth drive means such as a motor 46 serve to move the support frame 42 vertically relative to the lift frame 39.

The installation 1 further comprises legs 48 to improve its stability, and a cleaning cage 16a.

In the first embodiment shown in FIG. 1, at the front end of the support frame 42, i.e. facing the plane of advance of the carcasses P, said support frame carries the abutment device 43 which is also referred to as an "external guide"

device since it provides external guiding in contrast to the internal guiding. The abutment device 43 comprises a moving arm 49 mounted to move in horizontal translation perpendicularly to the plane of advance P of the carcass, as described below.

At its end closer to the plane P, the moving arm 49 carries an external guide member 50, and the perpendicular horizontal movement is imparted to it, for example, by a hydraulic, pneumatic or some other actuator, starting from a stable standby position.

The guide device 50 comprises two bottom wheels 51 and two top wheels 52.

The external guide member 43 is made such that, to cooperate with the changing external dorsal face 53 of the carcass, it has, via the guide member 50, an abutment zone adapting suitably and automatically to match the changes in the dorsal face 53.

When it is fitted to the free end of the moving guide arm 49, the guide device 50 is designed to be centered on the cutting plane P2.

The guide member 50 then forms a yoke serving to be fitted to the end of the moving arm 49 on a pivot pin 56. The arms 54 and 55 of the yoke typically form an angle having a value lying in the range 100° to 180°.

During cutting-up, the positions of the internal guide device 31 and of the external guide device 43 change as shown in FIGS. 3a to 3i and 4a to 4e.

Figure 13:
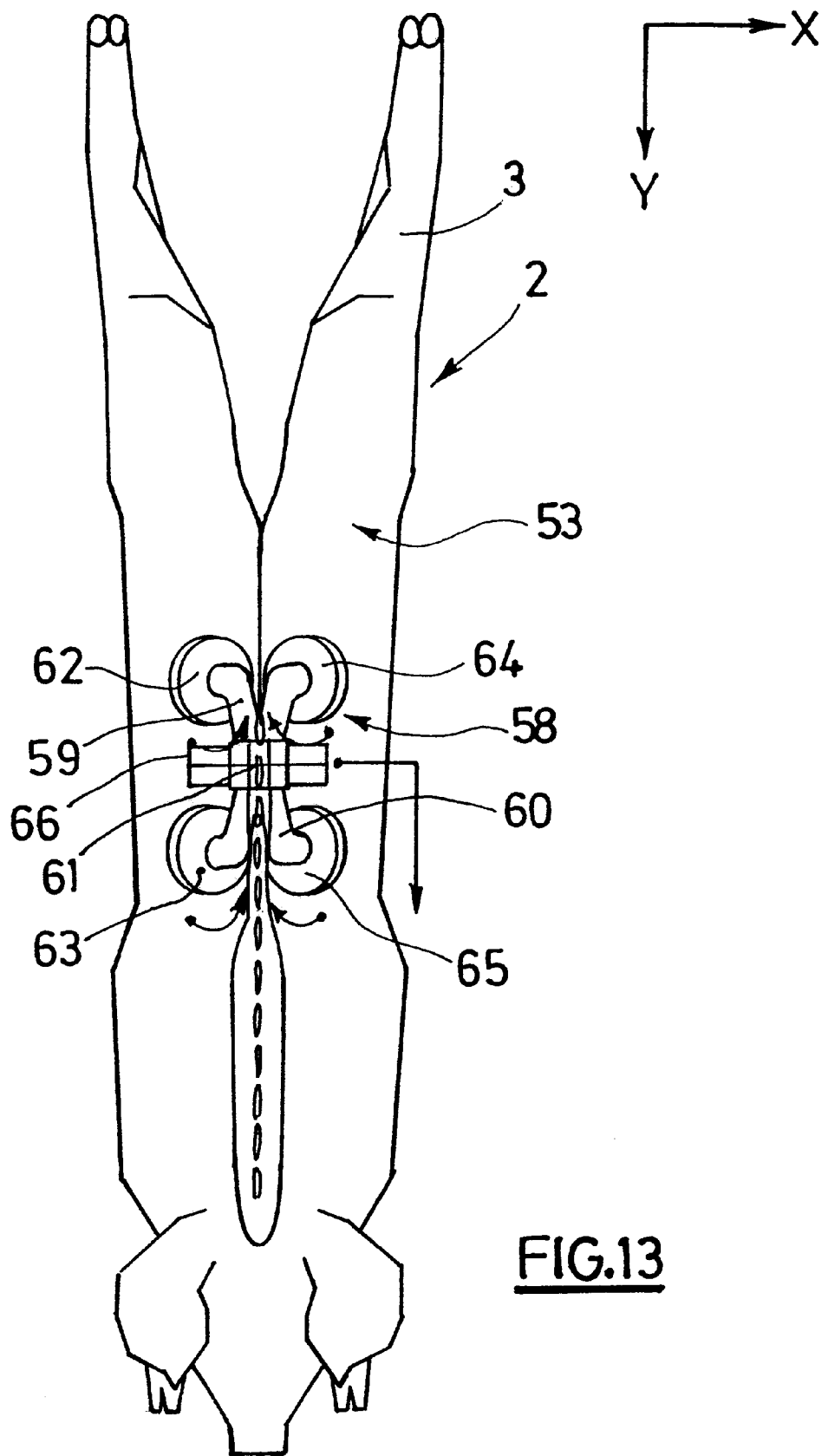
FIG. 13 is a diagrammatic view of the external guide device in an embodiment.
Figure 14:
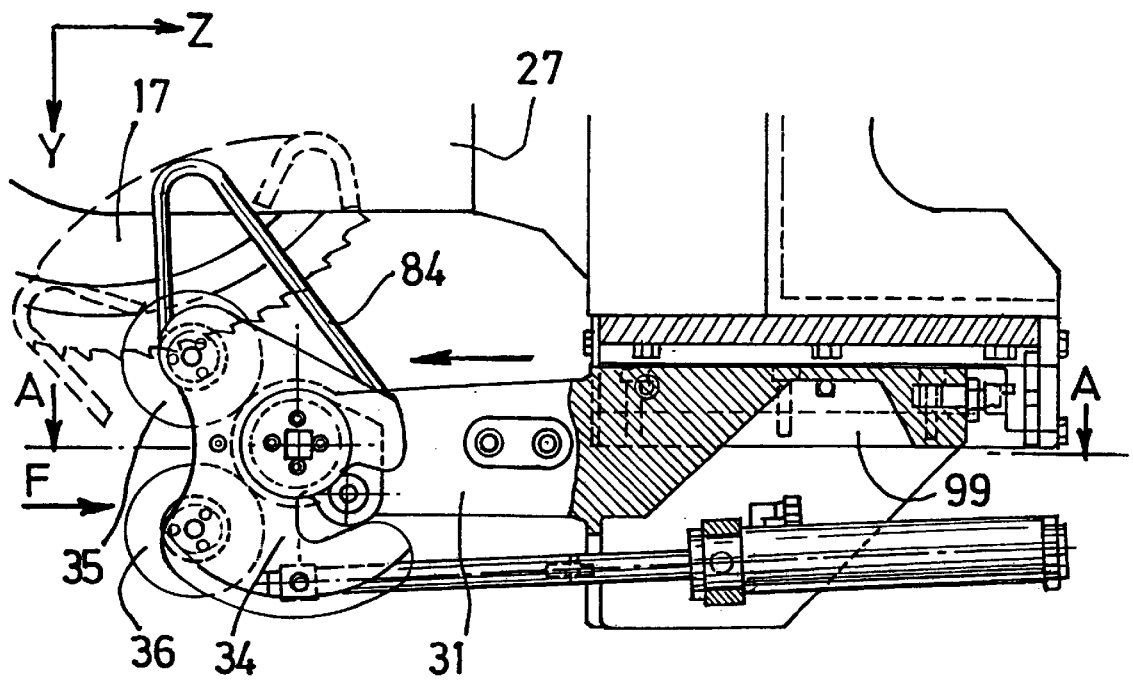
FIG. 14 is a horizontal view in enlargement showing the slidably-mounted internal guide system of the internal guide member.
Figure 15:
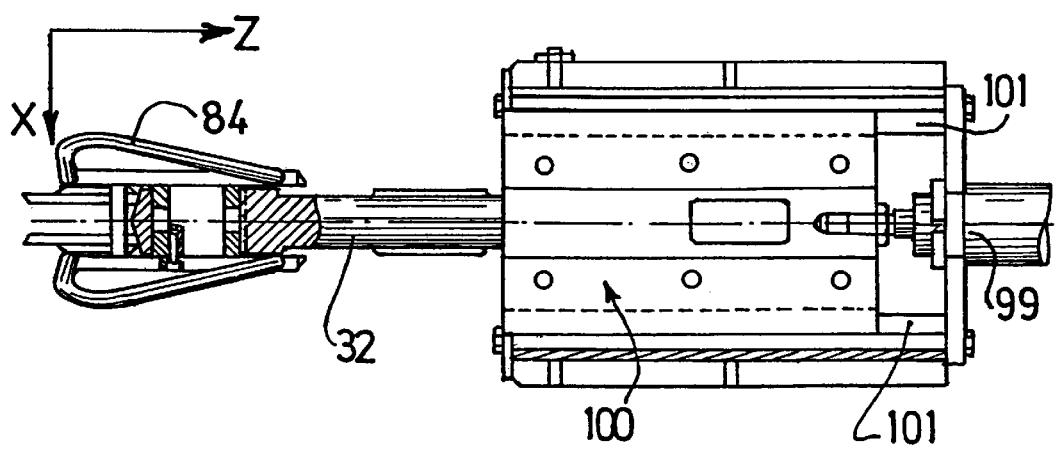
FIG. 15 is a view in section on A—A of FIG. 14.

In a second embodiment shown in FIGS. 5 and 13, for example, the structure of the external guide device 43 differs from the structure of the first embodiment. The device 43 comprises an arm 57 mounted to move perpendicularly to the plane P, rotatably supporting a yoke 58 that has two branches 59, 60 connected together at a link zone. The branch 59 supports a top wheel 62, and a bottom wheel 63. The branch 60 supports a top wheel 64 and thus a bottom wheel 65.

The four frustoconical wheels 62, 63, 64, and 65 are mounted to rotate about axes of rotation that slope at an angle a in the vicinity of 30° to the changing plane of the dorsal face of the animal during cutting-up, thereby causing a convergence effect that centers the meat and thus the apophyses for cutting-up purposes.

The yoke 58 is mounted to pivot about the horizontal pin 66 so as to match the outside dorsal shape of the carcass 2.

FIGS. 3a to 3i show the method of cutting up a carcass.

The cutting-up column 14 and the guide column 38 are shown in the cutting-up zone. To simplify the drawing, the successive operations take place as if the station were fixed in a static mode. However, as described, by means of the structure and of the control of the cutting-up station 14 and of the guide column 38, these operations take place in the three directions in three-dimensional space, the operation being referred to as "dynamic", and the cutting-up station being a moving station. At the same time as they move vertically during the cutting-up, the carrier beam 27 and the guide member 43 move horizontally in the direction of advance, the columns 14 and 38 moving horizontally and matching the movement of the carcass 2 being moved by the transporter 4.

In addition, the carrier beam 27 for carrying the saw 17 is moved so that it crosses the plane P and moves down along the backbone 3a of the carcass while cutting it up.

The pairs of internal guide wheels 35, 36 are then oriented into abutment against the inside face, along the backbone 3a as shown in FIGS. 4b to 4g.

The abutment yoke 58 bears against the outside dorsal face 53 of the carcass 2 with a force opposing the internal guide member 31.

Cutting-up continues from top to bottom of the carcass, with the saw 17 cutting through the backbone.

During the cutting-up, the cutting member 17 is rotated and, simultaneously, the lift carriage 16 is lowered so as to cut up the carcass 2 on the vertical cutting plane P2, and the carrier beam 27 moves in the transverse direction Z as cutting-up progresses and away from the plane of advance P.

During these movements, the internal guide member 31 follows the natural shape of the inside face of the carcass 2 by means of the hinge pin 33, while the external guide member 49 follows the outside shape of the carcass 2 by means of the horizontal pin 66 of the arm 57.

Simultaneously, as the internal guide member 31 and the external guide yoke 58 progress along the backbone, they act antagonistically to cause the cutting plane P2 to coincide with the plane of symmetry of each of the vertebrae of the rachis to divide the carcass into two half-carcasses.

The installation of the invention includes a control device for independently controlling the vertical movement firstly of the cutting member 17 and of the internal guide device 31, and secondly of the external guide means 43.

The link between the internal guide means 31 and the cutting member 17 is fixed in the vertical direction Y so that they are constrained to move together in said vertical direction. However, the guide device 31 can move in the direction Z relative to the cutting member 17, as described below.

The vertical movement of the lift carriage 16 relative to the lift column 15 is independent of the vertical movement of the support frame 42 relative to the lift frame 39.

By means of independent control, the method makes it possible to match a line of abutment of the external guide member 43 including the yoke 58 so as to offer abutment surfaces that match the morphology of the outside face over the entire length of the cutting-up from the lumbar region 67 to the "dorsal" region 68.

This independent control firstly relates to the vertical movement of the cutting member 17 and of the internal guide device 31. Thus, for example, as shown in FIGS. 4e and 4f, the yoke 58 of the external guide device 43 remains at a substantially identical height in both figures, whereas the cutting member 17 continues to move downwards.

Thus, the bottom end portion 69 is guided better, the abutment against the dorsal face 53 being sustained until the end of cutting-up, by stopping the downward movement of the abutment device 43, and in particular of the external guide yoke 58, while the cutting head 30 continues to move downwards to follow the spine.

Figure 4A:
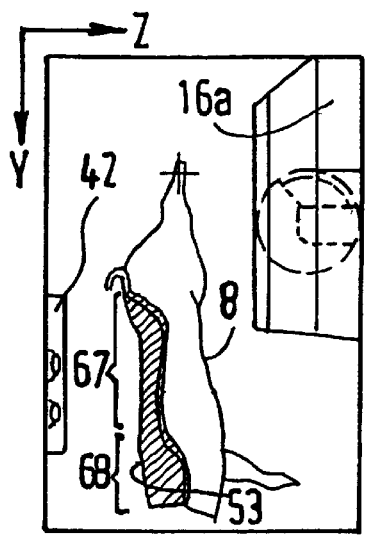
FIGS. 4a to 4h show an operating cycle of a third embodiment of an installation.
Figure 4B:
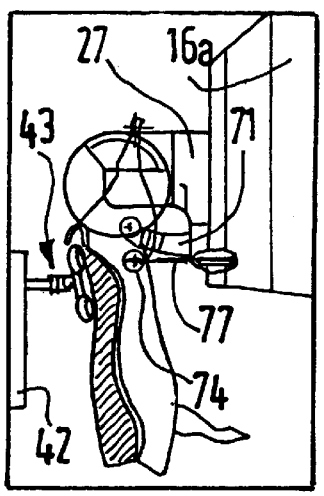
Figure 4C:
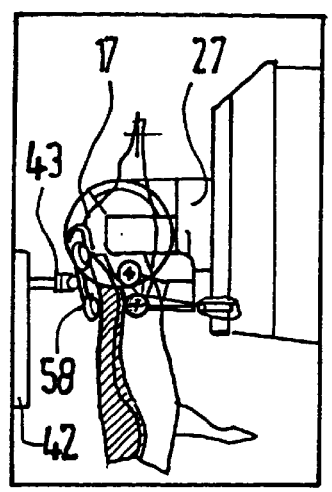
Figure 4D:
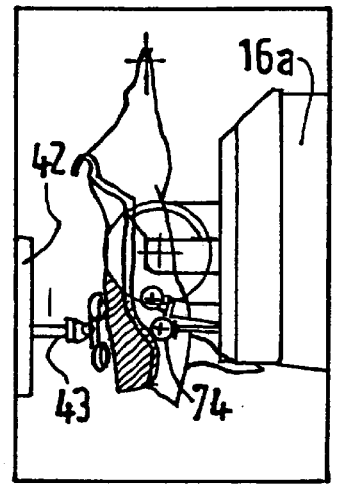
Figure 4E:
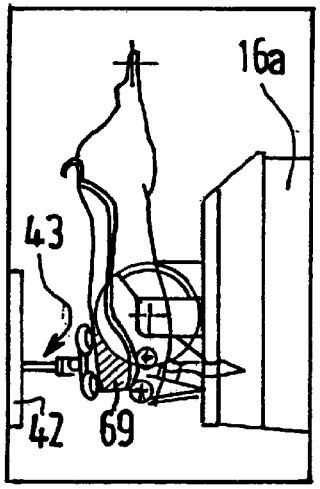
Figure 4F:
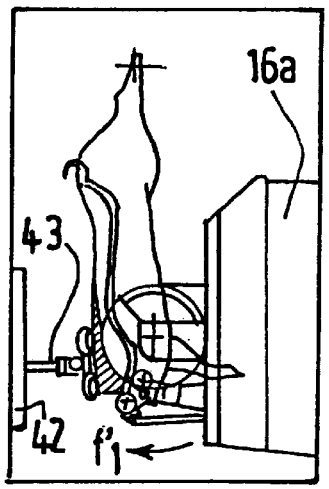
Figure 4G:
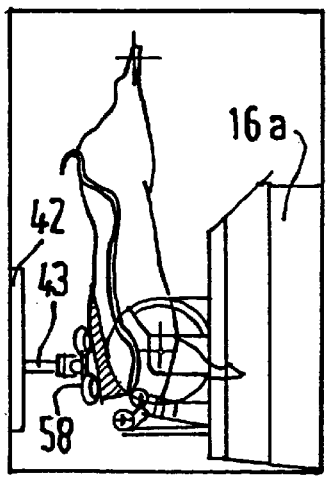
Figure 4H:
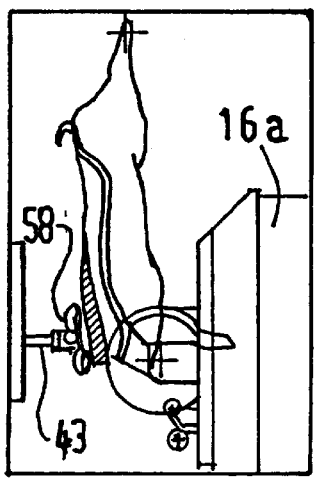
Figure 9:
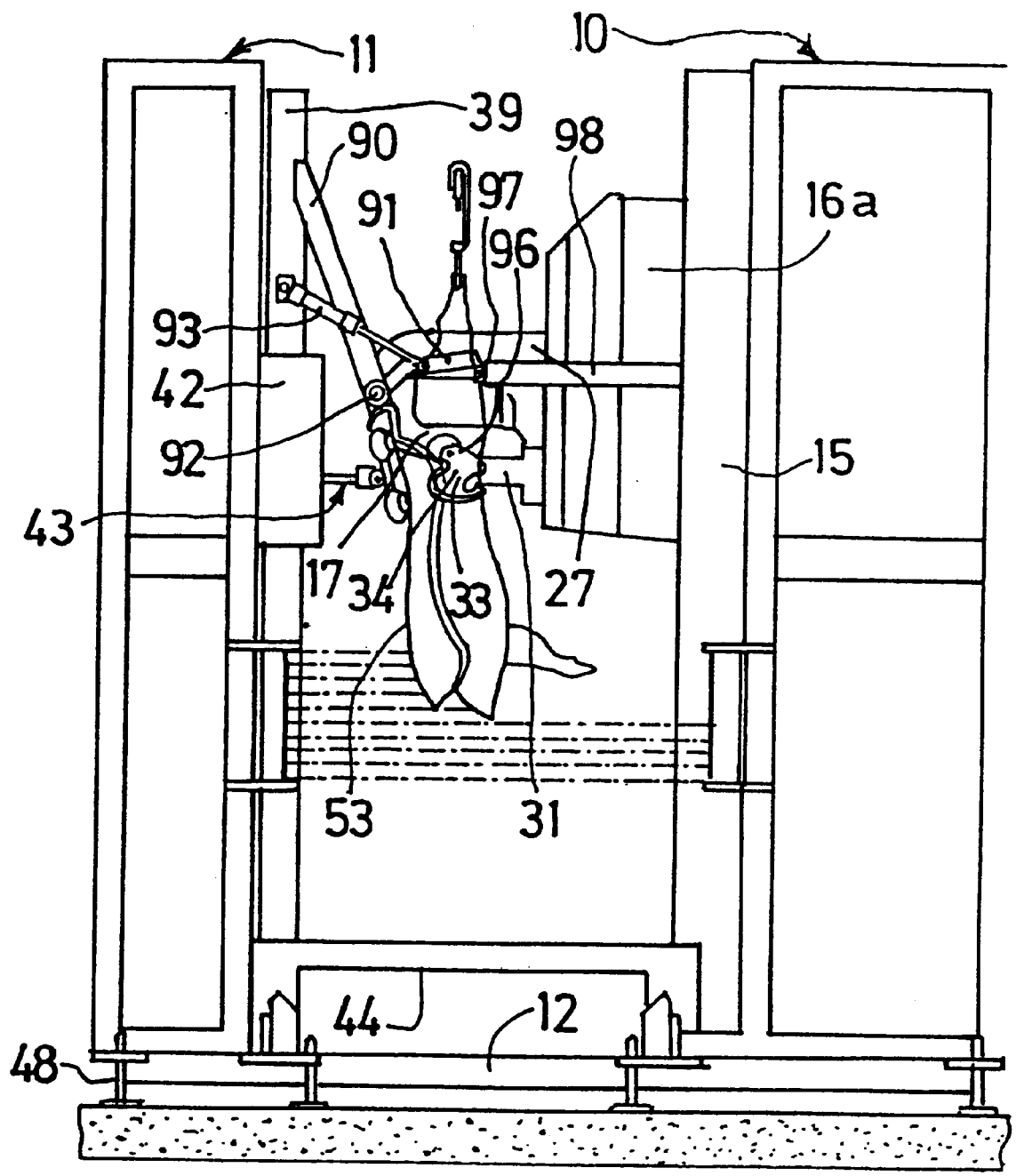
FIGS. 9 and 11 are section views through the ham protection means which are shown respectively in their engagement position and in their disengagement position at the beginning of cutting in an embodiment.
Figure 10:
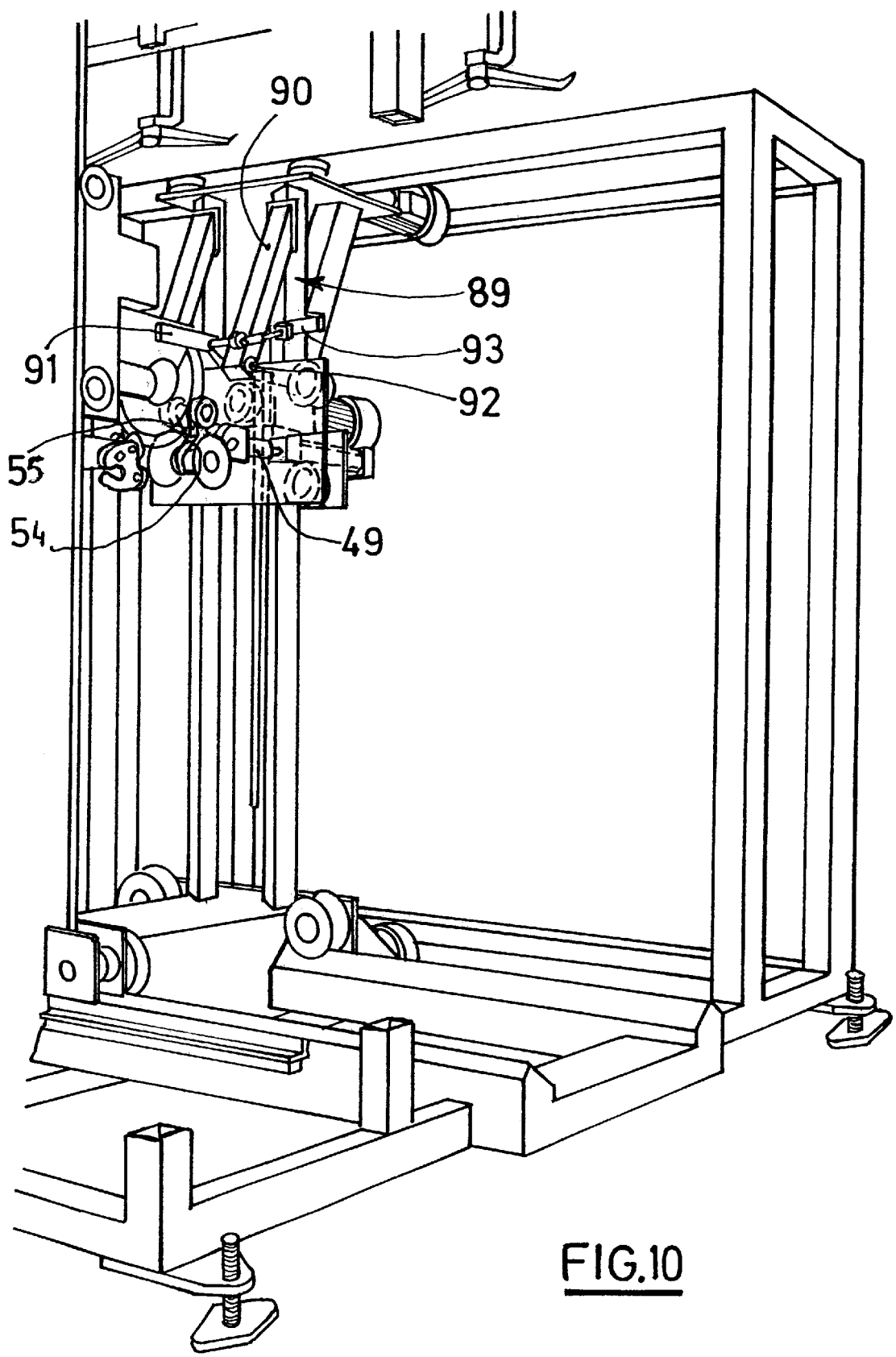
FIG. 10 is an overall perspective view of the installation of FIG. 1 as using the protection means.
Figure 12:
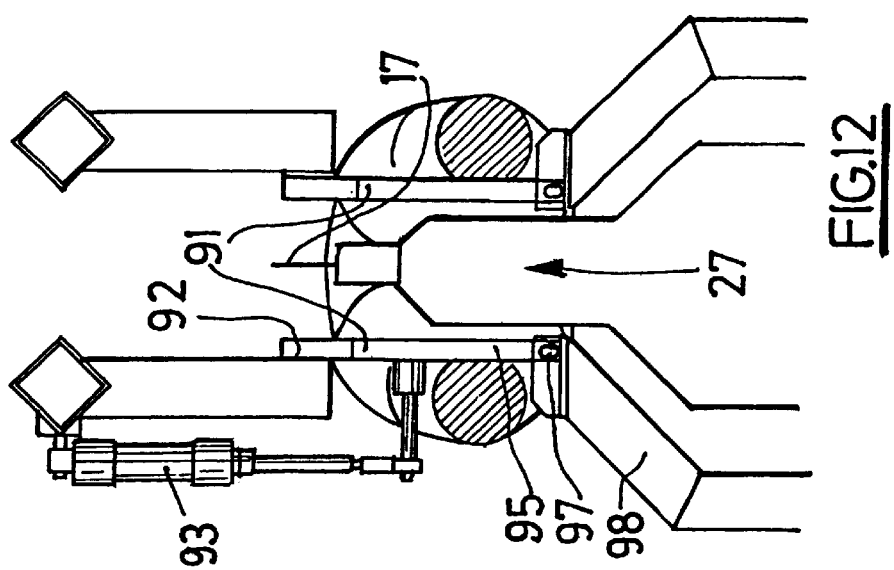
FIG. 12 is a plan view showing how the protection means operate.
Figure 11:
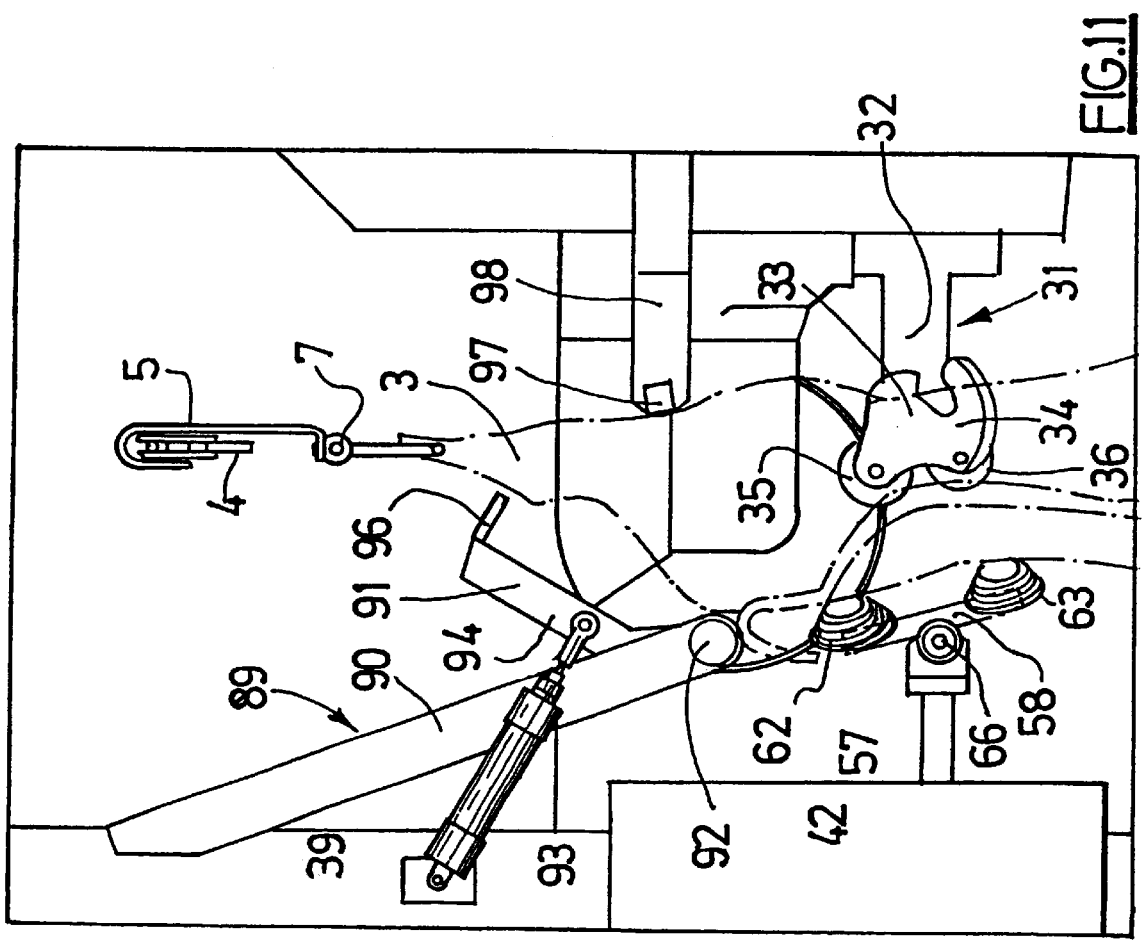

Similarly, between FIGS. 4b and 4c, the variation in the height of the external guide device, and in particular of the arms 57 of the yoke 58, is smaller than the variation in the height of the cutting member 17 and of the internal guide member 31, which members move down along the carcass 2.

It is thus possible to define a downward speed for the cutting member 17 that is different from the downward speed of the external guide member 43. It is also possible, prior to the start of cutting-up, to define a vertical position for the cutting member that is different from the external guide member.

This control also relates to the movement in the direction Z that is transverse to the plane of advance P.

Thus, by means of the external guide device 43 moving independently from the saw 17, e.g. by means of an in/out actuator, it is possible, during cutting, to cause the relative position of the saw 17 and of the yoke 58 to vary in said direction Z. For example, the distance A between the axis of the cutting head 17 and the axis of the yoke 58 in FIG. 3b becomes a distance A1 that is longer than the distance A in FIG. 3d, by means of the movement back towards the gantry 37 of the cutting-up carrier beam 27.

The distance between the cutting blade 17 and the internal guide device 31 is also controlled, and more particularly the distance between the axis of the cutting blade 17 and the axis of the pin 33 supporting the internal guide yoke 34 is controlled. For this purpose, a hydraulic actuator 99 may, for example, be used, making it possible to modify the position of the yoke 34 along the axis Z. The guide device 31 is mounted on a carriage 100 that is mounted to slide relative to guide rails 101 of the carrier beam 27. A telescopic internal guide beam is thus obtained. It is thus possible to leave a portion of rind not cut through on the back of the carcass. In one embodiment, it is also possible to use a motor drive capable of managing this relative movement.

The control and servo-control device of the invention comprises, for example, a computer mounted, for example, on the cutting-up assembly 10. The control device comprises a converter programmable logic controller, e.g. for digital-to-analog conversion, connecting the computer to the drive means 21, 25, 29, 45, 46 for driving the moving frames.

In addition, the drive means 21, 25, 29, 45, 46 for moving the moving frames of the installation 2 are connected to means for monitoring the position of each of the moving frames.

The first drive means 21 for moving the cutting-up frame 14 longitudinally are controlled by means for monitoring the longitudinal position of the lift column 15 in the direction X.

The second drive means 25 for moving the lift carriage 16 vertically are controlled by means for monitoring the vertical position of the carriage 16 in the direction Y.

The third drive means of the actuator type for moving the saw 17 transversely along the axis Z are connected to means for monitoring the position of the saw in the direction Z.

The fourth drive means 45 for moving the lift frame 39 longitudinally are synchronous with the first drive means 21.

The fifth drive means 46 for moving the support frame 42 vertically are connected to the means for monitoring the vertical position of the frame.

The sixth drive means for moving the support frame 42 frame transversely in the direction Z are connected to the means for monitoring the position of the guide member 43.

Each of the monitoring means transmits an appropriate signal to the control and servo-control device.

For example, the monitoring means may be target inductive light sensors for the cutting-up frame 14 and for the internal guide frame 38.

The end of cutting-up is described below in the second and third embodiments, and, when use is made of end-of-cutting detection by means of a system of the type for back-pivoting the internal guide yoke.

In such a case, provision is made for the vertical movement of the cutting member 17 to result in cutting up the carcass along the backbone 3a, but also in the dorsal portion external to said backbone, and therefore, if this operation takes place without any other limitation down to the bottom end portion 69 of the carcass, said carcass is cut up into two separate half-carcasses. To avoid this, the end of the carcass 70 is detected by means of the internal guide device 31 before the cutting member cuts through said end portion.

In the embodiment shown in FIGS. 3, 4, and 5, the internal guide device 31 is such that, at the end of cutting-up, the yoke 34 undergoes pivoting of the top wheels 35 and of the bottom wheels 36. When, starting from the position shown in FIG. 3e, the internal guide device 31 arrives in the vicinity of the bottom end 70 of the carcass, which end is constituted by the cervical portion in the absence of the head, the bottom wheels 36 exit from the carcass (FIG. 8) so that the yoke 34 is urged to pivot back as indicated by arrow f1 over an angular range that is significantly smaller than the angular range that it covers while it is following the rachis. This movement makes it possible to detect the desired end of cutting-up, thereby making it possible to trigger the end-of cutting cycle in which the position of the saw is set back relative to the external guide means: the carrier beam 27 is caused to retract towards the gantry 13, the blade 17 moving back away from the carcass. The internal guide device 31 is thus used as a detection beam.

It is also possible to provide at least three embodiments that do not use such a detection system with back-pivoting.

In one embodiment, the depth of cutting over the entire length of the carcass may be programmed in advance, the saw blade 17 moving down vertically, for example, over an identical stroke regardless of the carcass, provision being made for a distance to be left at the end of cutting-up that is long enough to ensure that the carcass is not fully separated into two half-carcasses at the end cutting-up.

In another embodiment, the movement of the cutting blade is programmed as a function of the dimensions of each animal, as measured before cutting-up, and in particular its length: the stroke of the cutting blade is defined as a function of a statistical mathematical relationship.

In another embodiment, the depth of cutting is adjusted during cutting-up as the cutting member moves downwards, the carrier beam 27 moving in the transverse direction Z by moving back as cutting-up progresses, i.e. by moving away from the two half-carcasses being formed.

In some cases, the saw blade tends to bring the carcass towards the cutting-up column, by retracting towards said column. It is then possible to provide a device such as the device described in Document EP-801 900 for pushing the carcass 2 out against the external guide device 43, so as to release it from the cutting member 17. For example, a detector and control means may be used. For example, the detector and the control means may be one and the same element and constituted by a rectilinear-type actuator such as a double-acting actuator incorporating a position sensor. The sensor may be constituted by a magnetic link between the cylinder and the piston of the actuator, or by a detector for detecting the variation in the pressure of a feed fluid going into the chamber of the actuator that is opposite from the chamber through which the piston rod passes, which piston rod is linked via pin to the bottom portion of the yoke 34 of the internal guide device 31. The actuator may be of the pneumatic or hydraulic type, and its feed circuit may be single-acting or double-acting.

In view of the shape of the inside dorsal phase of the carcass 2, the detector allows for a non-response range corresponding to the amplitude of the usual development of the yoke 34 as brought to follow the local shape of the rachis or of the backbone.

Figure 3A:
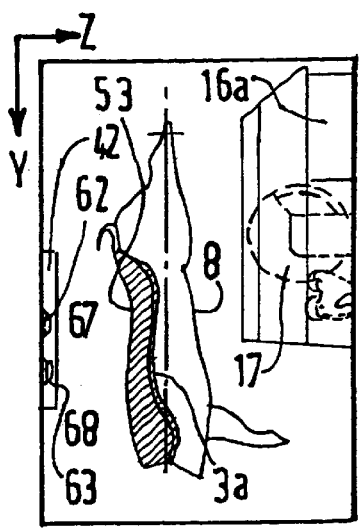
FIGS. 3a to 3i show an operating cycle of a second embodiment of an installation of the invention, showing how the relative position of the external guide device and of the cutting head varies during cutting.
Figure 3B:
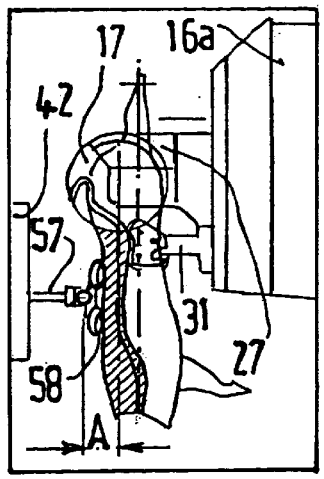
Figure 3C:
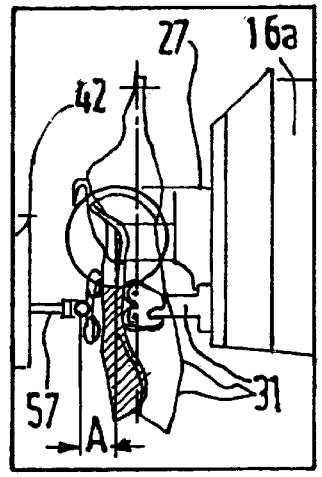
Figure 3D:
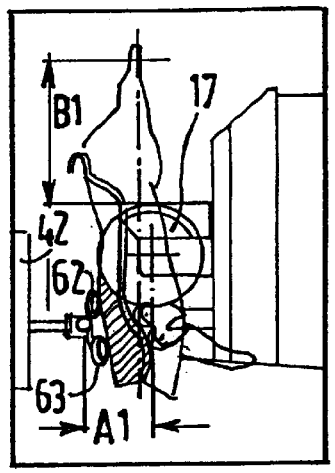
Figure 3E:
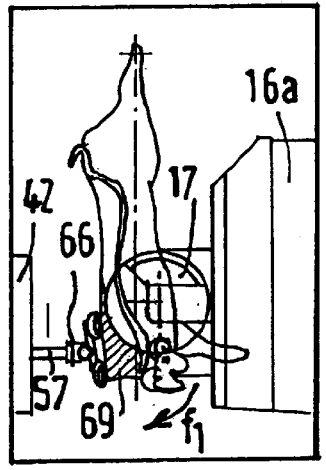
Figure 3F:
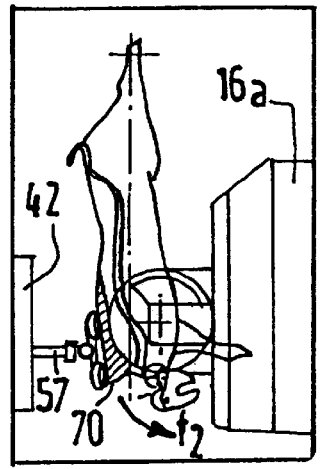
Figure 3G:
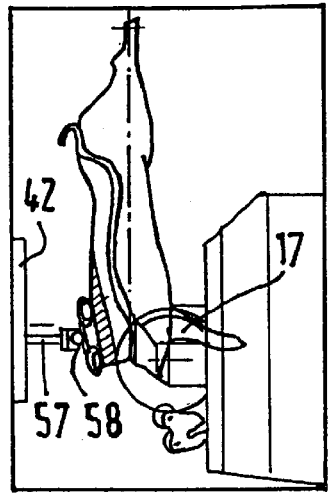
Figure 3H:
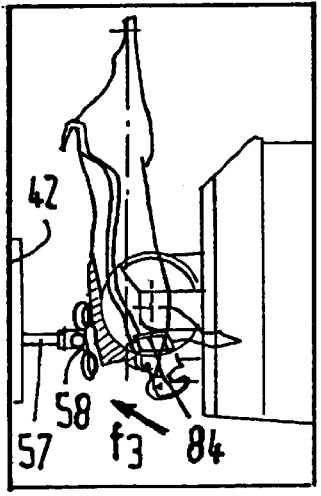
Figure 3I:
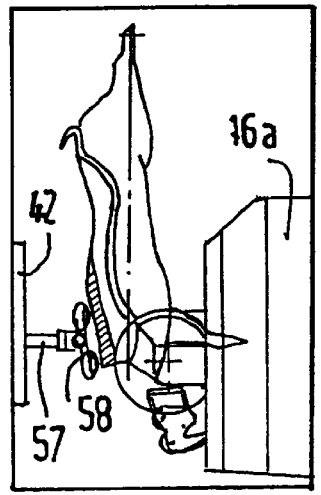

Back-pivoting in the direction indicated by arrow f1 (FIG. 3) activates the sensor which servo-controls the distributor so as to feed the chamber of the actuator in order to respond to the back-pivoting by causing forward-pivoting in the direction indicated by arrow f2 as shown in FIG. 3f. The pendulous mass constituted by the carcass in the partly cut-up state is then subjected to an action and to a movement in the direction f3 to move the non-cleaved bottom portion away from the zone of action of the cutting member 17. Spurs 84 make it possible to push the carcass 2 away.

A link zone thus remains between the two half-carcasses that are otherwise separated.

A third embodiment of the invention is described below in which the internal guide member has a structure that is different from the structure of the first and second embodiments.

The operating cycle in this embodiment of the installation is shown in FIGS. 4a to 4h.

The guide device 31 is carried by the support frame 42, below and slightly set back from the cutting member 17. It comprises an arm 71 which, via a horizontal pivot axis 72, carries a lever 73 that supports a pair of bottom wheels 74 (FIG. 6). The arm 71 also carries a pair of top wheels 75. Since the arm 71 is fixed, the position of the top wheels 75 is fixed relative to the saw 17, unlike the moving wheels 74. This fixed position of the wheels 75 makes it possible for good internal guiding of the carcass to be obtained.

The wheels 74 and 75 of the internal guide member 31 are oriented into abutment against the inside dorsal face along the backbone with a view to guiding the carcass internally relative to the cutting member 17. Facing them, the guide device 43 comprising the yoke 58 comes into abutment against the outside dorsal face 53 antagonistically to the internal guide member 31.

As in the first embodiment described, for the purposes of obtaining an "American cut", i.e. two half-carcasses that are not fully separated, the bottom end portion 69 of the carcass is detected.

The detection takes place consecutively to the back-pivoting of the lever 73, and it is followed by the retracting of the carrier beam 27, with the downward movement of the cutting blade 17 along the axis Y having been stopped.

The internal guide member comprises a piston 76 and a piston rod 77 which is connected via an axis 78 to the bottom portion of the lever 73. It is possible to interpose a detector 80 and control means 81. For example, the detector 80 and the control means 81 are one and the same element constituted by a rectilinear-type actuator that is single-acting or that is double-acting and that incorporates a position sensor formed, for example, by a magnetic link between the cylinder 82 and the piston 76 of the piston rod 77.

In view of the shape of the inside dorsal face of the carcass, the detector 80 allows for a non-response range corresponding to the usual pivoting amplitude of the lever 73 as it follows the local shape of the rachis or of the backbone.

Starting from the position shown in FIG. 4e, the movement of the carrier beam 27 brings the internal guide member 31 into the vicinity of the end portion 69 of the carcass, which portion is constituted by the cervical portion in the absence of the head in the example, the bottom wheels 74 exit from the carcass as shown in FIG. 4f, so that the lever 73 is urged to pivot back in the direction indicated by arrow f1 over an angular range that is significantly larger than the angular range of fluctuation that it covers when following the rachis. Such a system is applicable even when the head is present.

In the embodiment shown, the arm 71 has a rectilinear bottom face 85 that slopes at about 10° relative to the horizontal, and a top face 86 that is made of two segments 87 and 88 that slope relative to each other by an angle β of about 10°.

A protection device 89 is described below for protecting hams which are the portions of pork carcasses from which most value is extracted.

On either side of the carcass, this device 89 comprises:
a fixed support rod 90;
a hinged arm 91 mounted to pivot on the support rod 90 about a longitudinal pivot pin 92;
a control actuator 93 connected to the mid-portion 94 of the hinged arm 91.

At its free end portion 95, the hinged arm 91 is provided with a lug 96.

By means of the hinged arm 91 pivoting, the lug 96 can be received in a recess 97 in a fixing rod 98 secured to the cutting-up frame 14.

When the actuator 93 is in the long position, the hinged arm 91 pivots to come into a substantially horizontal position, the lug 96 being received in the recess 97. The gap between the two hinged arms 91 is wider than the transverse dimension of the saw, the two arms thus defining a passageway for the saw. When the arms 91 move downwards, they come into contact with the inside faces of the carcass 2, thereby forcing the hams apart over a distance larger than the distance between the outside faces of the arms.

This device 89 is put in place at the beginning of the operating cycle of the installation. The lugs 96 are held engaged in the recesses during cutting-up. The lugs are disengaged at the end of cutting-up so as to return to their initial position for the following carcass. The protection device 89 is mounted to move in translation along the axis X.

Like the base 44, the protection device facilitates cutting-up insofar as it reinforces the link between the moving abutment column 15 and the moving cutting-up column 14.

It should also be noted that uniting means such as a coupling beam interconnecting the columns 14, 15 via their tops in addition to the link via their bottoms may be used if the volume available for the installation so permits as a function of the characteristics of the conveyor and of the roof framework.

Other dynamic-mode embodiments of the installation that are not described in detail lie within the ambit of the invention. For example, instead of comprising a rotary saw, the cutting-up member may comprise cutting-up knives carried by the carrier beam.

A horizontally-movable lift column that supports a vertically-movable cutting-up carriage is described above. However, instead of the lift column 15, it is possible to use a lift frame of dimensions lying in the vicinity of the section of the gantry 13, such a frame being surrounded by the gantry 13. The carrier beam for carrying the cutting member is then supported by the lift frame, and is mounted to move in the longitudinal direction parallel to the direction of advance relative to the lift frame. Similarly, for the external dorsal guide assembly 11, said assembly then comprises a frame surrounded by the gantry 14 and mounted to move vertically. This external guide frame supports the external guide member which is mounted to move horizontally in the direction X relative to said external guide frame. But in such a configuration of the cutting assembly and of the external abutment assembly, in order for the cutting-up column and the abutment column to form a single frame, while allowing the carcasses to be conveyed, the uniting means may be in the form of a channel-section base moving in a cavity provided for this purpose in the floor.

As regards the horizontal and vertical movements of the moving frames, belt/cable type systems may be used.

In addition, by means of the cutting up member operating independently from the external guide member, the space between the two members may be adjusted to suit needs, in particular for cutting up sows or calves, for which a saw blade having a diameter of about 450 mm is often needed.

Furthermore, this installation is also suitable for performing special cutting-up. For example, it is possible to cut the carcass with the yoke 58, the loin being boned (apophyses removed), after opening up the fat and separating the meat on either side, and before cutting-up, in particular for producing Canadian bacon or Italian lonzo. Such cutting is of excellent quality and makes it possible to cut all of the apophyses accurately.

What is claimed is:

1. An installation (1) having a moving station for cutting up carcasses (2) of meat animals suspended from a transporter (4) by their hind legs (3), said installation comprising two columns (14, 15) facing each other and defining between them a space through which the animals to be cut up advance continuously, said two columns (14, 15) being mounted to move over a certain stroke in the direction in which the carcasses move, and in the opposite direction, an abutment one of the columns (15) carrying an abutment device (43) including means (50, 58) for coming into abutment against the outside dorsal face of the carcass along the backbone, following the cutting-up, the cutting-up other column (14) carrying firstly a cutting-up device (17) comprising cutting-up means (17) inserted via the ventral face under the tail, and mounted to move vertically, and secondly an internal guide device (31) comprising guide means situated under the cutting-up means (17) inserted via the ventral side of the carcass and acting against the abutment means (50, 58), said installation being characterized in that it further comprises a control and servo-control device for controlling and servo-controlling the movement of the internal guide device (31), of the abutment device (43), and of the cutting-up device (17), the control and servo-control device being suitable for enabling the abutment means (50; 58) to be moved independently from the cutting-up means (17), the abutment means being mounted to move vertically during the cutting up;

the control device including monitoring means for monitoring the position of the cutting-up means (17) and of the abutment means (50, 58), and is suitable for controlling the drive means (21, 25, 29, 45, 46) on the basis of speed profiles or position profiles that are predetermined or that are calculated fore each carcass; and the monitoring means comprising a detection device (34, 73) for detecting the bottom end portion (69) of the carcass, the detection device comprising two bottom wheels (35, 74) mounted on detection means actuated by an actuator rod, the detection means being moved to a threshold position causing the cutting-up means to be retracted.

2. An installation according to claim 1, characterized in that the detection means are constituted by a yoke (34) carrying the top guide wheels (35) and the bottom guide wheels (36), the axis of rotation of the bottom wheels and the axis of rotation of the top wheels of the guide means being movable relative to the axis of rotation of the cutting-up member (17).

3. An installation according to claim 1, characterized in that the detection means are constituted by a lever (73) carrying the bottom guide wheels (74), the axis of rotation of the top wheels (75) being fixed relative to the axis of rotation of the cutting member, while the axis of rotation of the bottom wheels is movable relative to the axis of rotation of the cutting member.

4. An installation according to claim 1, characterized in that it further comprises a protection device (84) for protecting the hams of the carcass, which device includes retractable protection means (91) carried by the lift column and fixed relative to the carcass, which means serve by tilting or moving in some other manner above the hams to co-operate with at least one receiving zone (97) of the abutment column that is fixed relative to the carcass, so as to hold the hams apart while avoiding any unwanted contact between them and the carrier beam (71).

5. An installation having a moving station for cutting up carcasses of meat animals, suspended from a transporter by their hind legs, comprising a cutting-up assembly and an abutment assembly, said cutting-up assembly comprising:
   a first fixed structure;
   said first fixed structure mounting a cutting-up column which carries a cutting-up device, said cutting-up device comprising cutting-up means inserted via the ventral face under the tail and secondly an internal guide device comprising guide means situated under the cutting-up means inserted via the ventral side of the carcass,
   the abutment assembly comprising:
   a second fixed structure;
   said second fixed structure mounting an abutment column which carries an abutment device, said abutment device comprising abutment means for coming into abutment against the outside dorsal face of the carcass along the backbone, following the cutting-up, said abutment means and internal guide means acting antagonistically,
   the two columns facing each other and defining a space between them through which the animals to be cut advance continuously, said two columns being linked together in order to form a single chassis movable in respect to their fixed structure over a certain stroke in the direction in which the carcasses move, and in the opposite direction
   said cutting-up device being movable vertically in respect to the cutting-up column, said cutting-up means and said internal guide device being movable in respect to the cutting device horizontally perpendicularly to the direction in which the carcasses move,
   said abutment device being movable vertically in respect to the abutment column, said abutment means being movable in respect to the abutment device horizontally perpendicularly to the direction in which the carcasses move,
   said installation further comprising a control and servo-control device of the movement of the internal guide device, of the abutment device and of the cutting-up device, the control and servo-control device being suitable for enabling the abutment means to be moved independently from the cutting-up means during the cutting-up.

6. An installation according to claim 5, said installation being characterized in that the two columns are linked together by a linking chassis.

7. An installation according to claim 6, said installation being characterized in that the linking chassis is situated at the bottom of the columns, the linking chassis and the columns having together a U-shape.

8. An installation according to claim 7, said installation being characterized in that it further comprises uniting means for uniting the cutting-up column and the abutment column, the cutting-up column and the abutment column forming a single unit so as to guarantee the desired face-to-face position of the external abutment means, of the cutting-up means, and the internal guide means during cutting-up.

9. An installation according to claim 8, characterized in that the cutting-up column comprises a lift column mounted to be moved in translation parallel to the horizontal direction of advance of the carcasses by first drive means, a lift carriage mounted to be moved in translation vertically relative to the moving column by means of second drive means, and a carrier beam for carrying the cutting-up device, which beam is mounted be moved relative to the lift carriage and to be brought from a retracted position to a cutting-up position by third drive means, the first drive means, the second drive means, and the third drive means being distinct and connected to programmable logic controller of the control and servo-control device which also controls actuating of the cutting-up means.

10. An installation according to claim 9, characterized in that the abutment column comprises a moving lift frame that is mounted to be moved parallel to the horizontal direction of advance by fourth drive means, a support frame for supporting the abutment device, which frame is mounted to be moved vertically relative to the lift frame by fifth drive means, the uniting means interconnecting the moving column and the lift frame via their tops or via their bottoms, the fourth and fifth drive means being distinct and connected to the programmable logic controller constituting the distributor of the control and servo-control device which also controls the actuating of the cutting member.

11. An installation according to claim 8, characterized in that the cutting-up column (14) comprises a first lift frame mounted to move in vertical translation relative to a fixed structure (13), supporting a cutting-up frame that is mounted to move in horizontal translation relative to the first lift frame parallel to the direction of advance of the carcasses, the cutting-up frame supporting the carrier beam for carrying the cutting member, which beam is itself mounted to move transversely to the direction of advance of the carcasses.

12. An installation according to claim 11, characterized in that the abutment column comprises a second lift frame that is mounted to move in vertical translation, and that supports the external abutment frame mounted to move in horizontal translation relative to the second lift frame, the abutment frame supporting the guide member which is mounted to move transversely to the direction of advance of the carcasses, it being possible for the uniting means for assembling the single unit formed by the cutting-up column and by the abutment column to move in a groove situated in the floor.

13. An installation according to claim 12, characterized in that the third drive means comprise an in/out actuator making it possible for the internal guide mans to be moved relative to the cutting-up means.

14. An installation according to claim 13, characterized in that the internal guide device comprises two top guide wheels and two bottom guide wheels mounted on the same support arm, and the abutment device comprises an external abutment yoke that can be retracted from a position in which it is spaced apart from the dorsal face of the carcass to a position in which it abuts against said dorsal face, the yoke carrying two top abutment wheels and two bottom abutment wheels, the abutment wheels being antagonistic to the guide wheels.

15. An installation according to claim 14, characterized in that the control device includes monitoring means for monitoring the position of the cutting-up means and of the abutment means, and is suitable for controlling the drive means on the basis of speed profiles and/or position profiles that are predetermined or that are calculated for each carcass.

16. An installation according to claim 15, characterized in that the monitoring means comprise a detection device, for detecting the bottom and portion of the carcass, the response to such detection being to cause the cutting-up means to be retracted.

17. An installation according to claim 16, characterized in that the detection device comprises an emitter element for emitting a light beam, which element is carried by an arm fixed to the carrier beam, and a receiver element fixed to the bottom portion of the support frame for supporting the internal guide member, so that the carcass to be cut up intercepts the light beam until the desired cutting-up position is reached.

18. An installation according to claim 16, characterized in that the detection device comprises two bottom wheels mounted on detection means actuated by an actuator rod, the detection means being moved to a threshold position causing the cutting-up means to be retracted.

19. An installation according to claim 18, characterized in that the detection means are constituted by a yoke carrying the top guide wheels and the bottom guide wheels, the axis of rotation of the bottom wheels and the axis of rotation of the top wheels of the guide means being movable relative to the axis of rotation of the cutting-up member.

20. An installation according to claim 18, characterized in that the detection means are constituted by a lever carrying the bottom guide wheels, the axis of rotation of the top wheels being fixed relative to the axis of rotation of the cutting member, while the axis of rotation of the bottom wheels is movable relative to the axis of rotation of the cutting member.

21. An installation according to claim 20, characterized in that the axes of rotation of the wheels of the external abutment yoke are substantially parallel to the dorsal face of the carcass during cutting-up.

22. An installation according to claim 21, characterized in that, during cutting-up, the axis of rotation of each of the wheels of the external abutment yoke points towards the dorsal face of the carcass at an angle in the vicinity of 45° thereto, the wheels being frustoconical, making it possible to re-center the flesh and the apophyses before the saw blade passes.

23. An installation according to claim 22, characterized in that the cutting member comprises a rotary saw of diameter in the range 300 mm to 600 mm and that can be used in particular for sows and calves, or else it comprises cleaving knives.

24. An installation according to claim 22, characterized in that it further comprises a protection device for protecting the hams of the carcass, which device includes retractable protection means carried by the lift column and fixed relative to the carcass, which means serve by tilting or moving in some other manner above the hams to co-operate with at least one receiving zone of the abutment column that is fixed relative to the carcass, so as to hold the hams apart while avoiding any unwanted contact between them and the carrier beam.

25. A method according to claim 24, characterized in that the cutting-up device and the external guide device are moved relative to each other along a substantially vertical axis and in a direction therealong such that the external guide means perform external guiding until the end of the cutting-up.

26. A method of implementing an installation according to claim 24, said method being characterized in that it comprises the following steps:

measuring the carcass, the body of the animal being whole, with or without the head, and not slit on the backbone side, and detecting the start of cutting up;

actuating the control and servo-control device;

causing the cutting-up column and the abutment column to move accordingly so as to move the cutting-up device and the abutment device in all three dimensions, the abutment means being applied against the outside dorsal face of the animal, and the cutting-up member performing the cutting-up, the carcass being moved simultaneously with the cutting-up;

detecting the end-of-cutting position;

stopping the cutting-up, removing the cut-up carcass, and returning the cutting member and the abutment member to their initial position for the following carcass.

27. A method according to claim 26, characterized in that the end-of-cutting detection is performed as a function of whether the internal guide device is bearing against the end portion of the carcass.

* * * * *